Patented Mar. 4, 1930

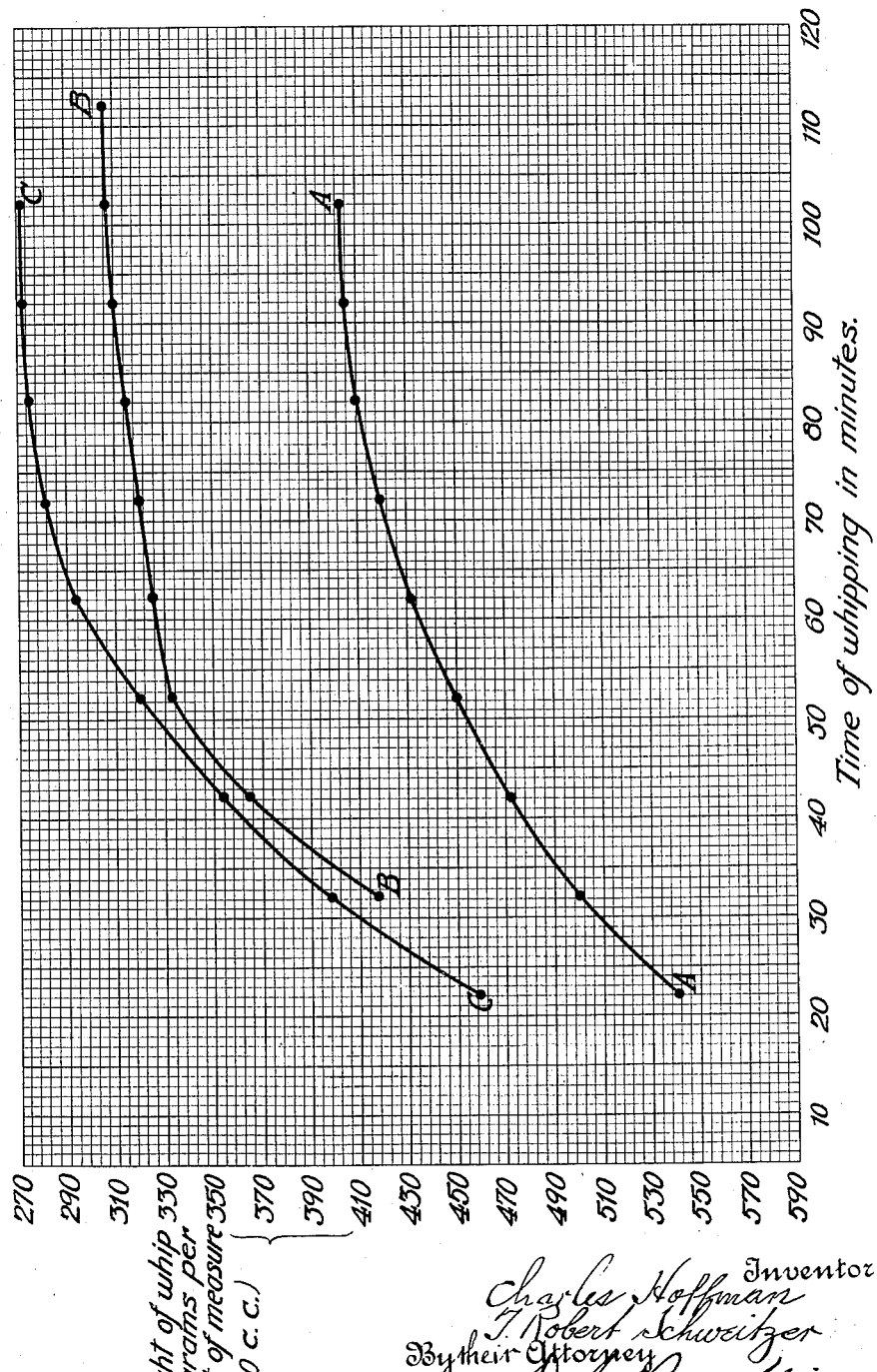

1,749,427

UNITED STATES PATENT OFFICE

CHARLES HOFFMAN, OF TUCKAHOE, AND THOMAS ROBERT SCHWEITZER, OF OZONE PARK, NEW YORK, ASSIGNORS TO WARD BAKING COMPANY, OF NEW YORK, N. Y., A CORPORATION OF NEW YORK

TREATING BUTTER

Application filed December 12, 1925. Serial No. 74,919.

Butter is an essential ingredient in the manufacture of most cakes. It contributes nutritive value, shortening properties and flavor and aids in producing lightness, a fine velvety texture. In the manufacture of cake it is essential that the butter be properly incorporated and evenly distributed in the batter. The usual practice is to whip the butter in a whipping machine with an equal weight of powered sugar or strach or flour until a certain degree of lightness is obtained. The whipping brings about a condition in which the butter can be more easily and uniformly distributed in batter or dough.

To secure a light cake of a fine velvety texture, a butter with good whipping qualities must be used. A heavy butter whip will not incorporate well with the other ingredients of the dough, and will produce a heavy cake of coarse texture.

We have discovered that not all butters will whip to the same degree of lightness, and that ladled butter is better in this respect than the creamery butter which is more largely used in cake manufacture. The supply of ladled butter is irregular and uncertain and often has poor flavor and contains impurities. The lightness of the cake may be increased by using more eggs and baking powder; but this is not so desirable because increased quantities of baking powder affect the flavor unfavorably and because a fine velvety texture is obtained, only by the use of a satisfactory butter.

By extensive investigation and experiment we have discovered a method of treatment or "processing" whereby deficient butters may be improved for use in the manufacture of cake. Creamery butter can be given a whipping quality superior to that of ordinary ladled butter, and the whipping quality of ladled butter can also be improved. We have found that commercial creamery butter of high grade which ordinarily makes a heavy cake of coarse texture can be converted by our process into a condition in which it whips up lightly and incorporates to the best advantage with the other ingredients of the batter and produces a light cake of fine velvety texture. The butter thus processed will retain its improved condition for a long time and can be refrigerated and shipped from the creamery for example, as a commercial manufactured product.

The accompanying drawing shows by three separate curves the effect of whipping three different samples of butter. The curve A—A is that of a very high grade creamery butter in ordinary commercial condition. By whipping it for about a hundred minutes it was brought from a weight of 540 grams per unit of measure to about 400 grams. The curve B—B is that of commercial ladled butter; which in about the same period of whipping was brought from 420 grams per unit of measure to about 305 grams. The curve C—C is that of the high grade creamery butter of curve A—A, but processed according to this invention. In about the same length of time as the others it whipped up from 460 grams per unit of measure to 270 grams. Beyond the time periods shown, further agitation effected no substantial improvement in lightness. In the course of a number of careful observations and extensive experiments we found that a great variety of butters treated by our process whipped up subsequently to approximately the same degree of lightness, introducing the valuable feature of uniformity in this ingredient, and hence in the manufactured cake. The tests were carried through to the making of commercial batches of cake under plant conditions, using butter from different shipments. The cakes were uniformly light and of a fine even velvety texture and improved flavor.

Chemical analysis of the different butters failed to explain why one was satisfactory and another unsatisfactory. We found, however, that the butter was improved in whipping and baking qualities by thorough agitation, beating, mixing or homogenization at a temperature where the butter fat is soft enough to permit a uniform mixing of the butter constituents (fat, curd, salt and water) without separation of these constituents. We have discovered that the physical condition of thorough admixture or emulsification produces the desired improvement in whipping qualities. The best results were obtained with a temperature between 80 and 85 degrees Fahrenheit. Good results have been obtained by agitation at 75 degrees. At temperatures of 60 degrees or less very little improvement is brought about. The agitation may be started at 80 to 85 degrees and finished at a lower temperature, or started at a lower temperature and finished at 80 to 85 degrees, with some improvement in either case. But it is best to start, carry on and finish the agitation at 80 to 85 degrees. At about 90 degrees, the ingredients tend to separate and the agitation is not so effective in improving the quality.

The speed of the device used in the mixing or agitation must be high enough to insure complete admixture of the constituents. Beyond such a speed no improvement has been observed.

For maximum results, the butter must be properly handled. Butters that have been melted, with separation of the ingredients, can be improved greatly by the process, but not to the same extent as when they have not been melted. Also, if the butter is agitated before it reaches the desired temperature, the results are not quite so good as when it is brought gradually to the desired temperature in a medium such as air or water before agitation.

The butter processed according to this invention can be used with advantage in ordinary cakes such as we have designed and in a great variety of other products calling for the use of butter or fat as an ingredient. The process can be conveniently applied in the creamery by additional working of the butter at the temperatures mentioned herein. The usual temperatures for churning butter in the creamery are from 55 to 65 degrees, under which conditions it does not acquire the properties given to it by this process. Butter processed according to this invention can be subsequently refrigerated and kept for a long time without losing its valuable properties, so that it becomes a practical commercial product.

Such subsequent refrigeration after the agitation, beating, mixing or homogenization described causes the butter fat to harden or solidify, this occurring at about 65° F. or lower. Such refrigeration may be accomplished by tubbing the butter and placing it in a refrigerator at 40° F. to 50° F. and allowing it to cool thoroughly. The refrigeration brings about profound changes in the character of the fat crystals.

We are familiar with the fact that butter has been creamed and mixed with sugar in the manufacture of cake. This ordinary process does not improve the whipping quality of the butter nor correct any defective quality in the butter in this respect. The purpose of this usual operation is wholly or chiefly the better incorporating of the butter with the other ingredients of the cake. The purpose of the present invention on the other hand is to increase the whipping quality (the limit of lightness to which the butter may be whipped at a given temperature) and to do this particularly with market butters which are normally lacking in whipping qualities. The present invention provides for processing of the butter before it is whipped or creamed in the actual making of the cake.

Various modifications of the embodiment of the invention described may be made by those skilled in the art without departing from the invention as defined in the following claims.

What we claim is:—

1. The method of improving the whipping quality of butter which consists in agitating it at a temperature where the fat is soft enough to permit of a uniform mixing of the constituents and below the temperature at which the constituents separate and refrigerating sufficiently for the butter fat to harden.

2. The method of improving the whipping quality of butter which consists in agitating it at a temperature between 75 degrees and 90 degrees Fahrenheit to thoroughly mix the constituents and refrigerating sufficiently for the butter fat to harden.

3. The method of improving the whipping quality of butter which consists in agitating it at a temperature of about 80 to 85 degrees Fahrenheit to thoroughly mix the constituents and refrigerating sufficiently for the butter fat to harden.

4. The method of improving the whipping quality of butter which consists in bringing the butter undisturbed to a temperature between 75 degrees and 90 degrees Fahrenheit and then thoroughly mixing the constituents thereof and refrigerating sufficiently for the butter fat to harden.

5. The method of improving the whipping quality of butter which consists in bringing the butter undisturbed to a temperature between 80 degrees and 85 degrees Fahrenheit and then thoroughly mixing the constituents thereof and refrigerating sufficiently for the butter fat to harden.

6. The method of improving the whipping quality of butter which consists in substantially uniformly mixing its constituents (fat, curd, salt and water) at a suitable temperature and then refrigerating sufficiently for the butter fat to harden.

In witness whereof, we have hereunto signed our names.

CHARLES HOFFMAN.
T. ROBERT SCHWEITZER.